July 27, 1943.　　　　I. MARINSKY　　　　2,325,332
INTEGRAL SEPARABLE FASTENER
Filed Dec. 31, 1942　　　2 Sheets-Sheet 1
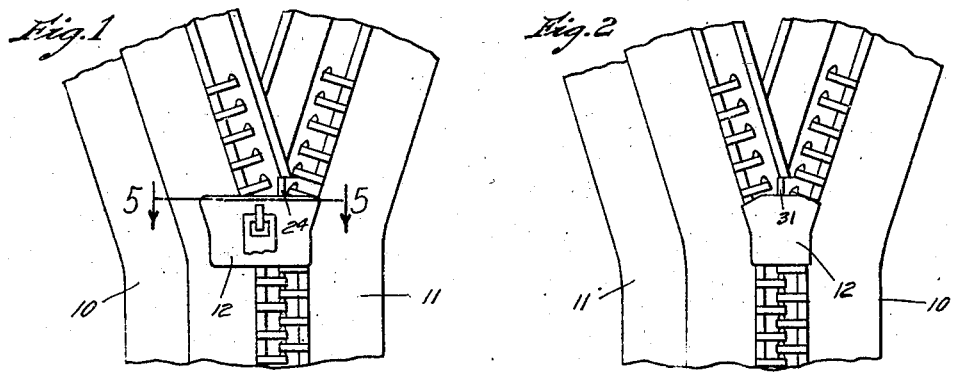
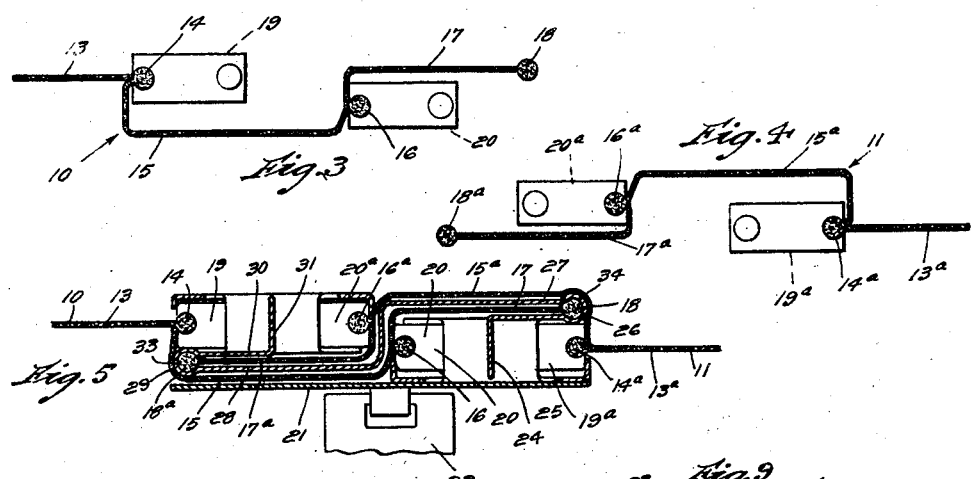
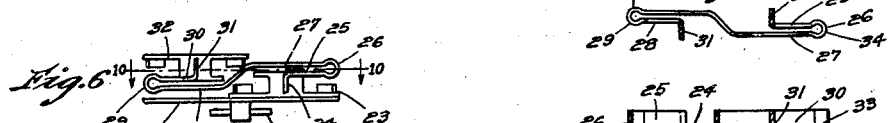
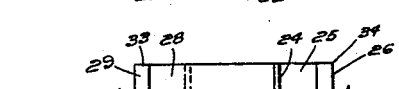
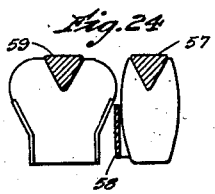
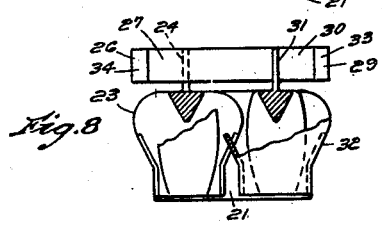
Inventor
Isaac Marinsky
Nathaniel Frucht
By
Attorney July 27, 1943.  I. MARINSKY  2,325,332
INTEGRAL SEPARABLE FASTENER
Filed Dec. 31, 1942  2 Sheets-Sheet 2
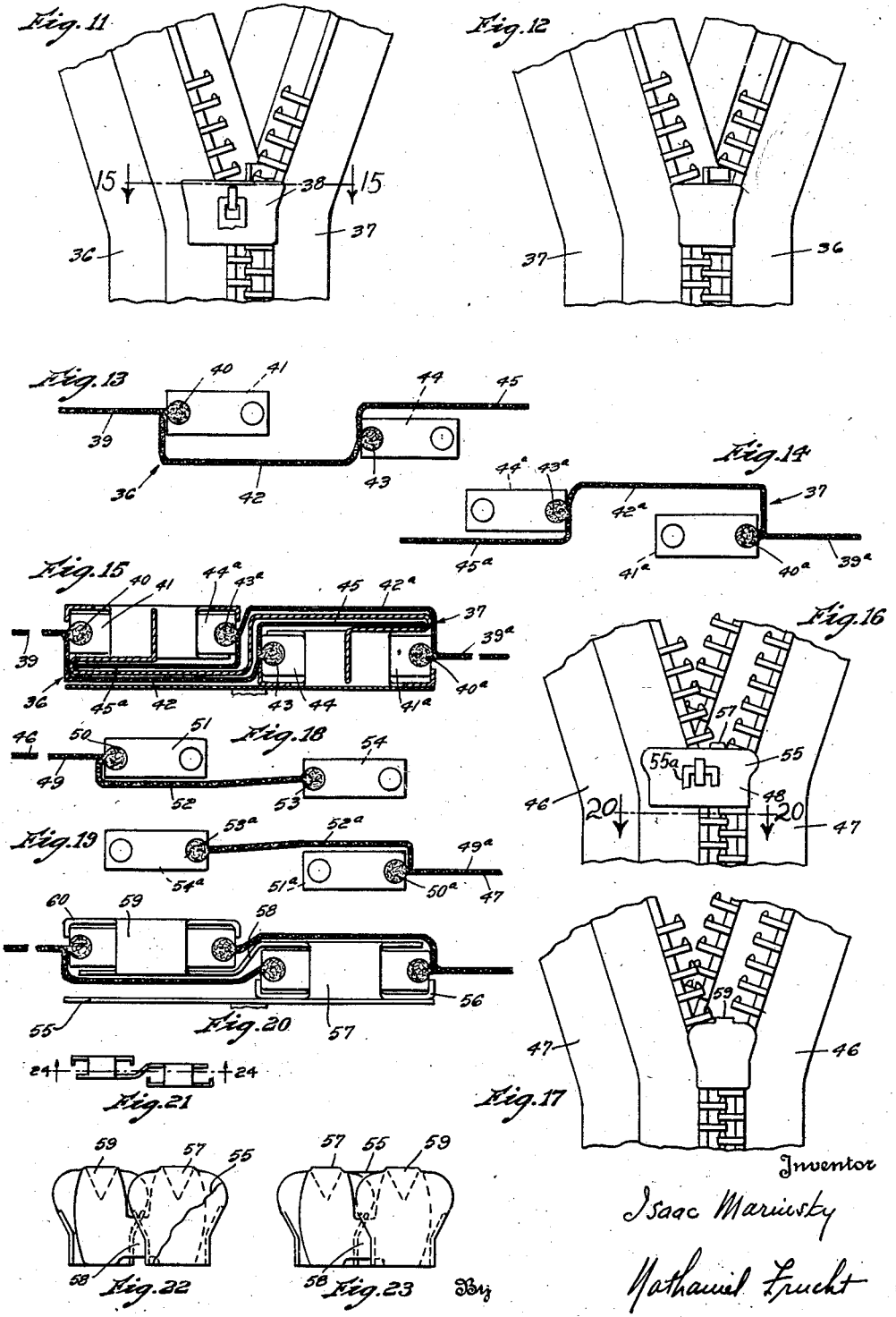
Inventor
Isaac Marinsky
Nathaniel Frucht
Attorney Patented July 27, 1943

2,325,332

UNITED STATES PATENT OFFICE 2,325,332

INTEGRAL SEPARABLE FASTENER

Isaac Marinsky, Providence, R. I.

Application December 31, 1942, Serial No. 470,719

9 Claims. (Cl. 24—205)

The present invention relates to separable fasteners employing closure links coupled by means of a movable slider, and has particular reference to a novel one-piece construction for a multiple fastener.

It is the principal object of the invention to provide a multiple fastener which utilizes two special type tapes, each tape being one piece construction, and carrying two sets of closure links.

Another object of the invention is to provide a multiple fastener which is not appreciably thicker than a single fastener.

Still another object of the invention is to provide a multiple fastener which is hermetically sealed against fluid leakage by means of interlocking sealing edges.

A further object is to provide an improved slider which automatically interlocks the sealing edges and prevents distortion and jamming of the fastener parts.

With the above and other objects and advantageous features in view, the invention consists of a novel arrangement of parts more fully disclosed in the detailed description following, in conjunction with the accompanying drawings, and more specifically defined in the claims appended thereto.

In the drawings,

Fig. 1 is a front view of the novel fastener assembly;

Fig. 2 is a rear view thereof;

Figs. 3 and 4 are respectively enlarged perspective details of the two cooperating fastener tapes;

Fig. 5 is an enlarged sectional detail through the fastener assembly, on the line 5—5 of Fig. 1;

Figs. 6, 7 and 8 are respectively top, front and rear views of the novel slider;

Figs. 9, 10 are respectively sections on the line 9—9 of Fig. 7 and 10—10 of Fig. 6;

Figs. 11, 12 are respectively front and rear views of a modified fastener assembly;

Figs. 13 and 14 are respectively enlarged sectional details of the two cooperating tapes therefor;

Fig. 15 is an enlarged section on the line 15—15 of Fig. 11;

Figs. 16 and 17 are respectively front and rear views of another modified fastener assembly;

Figs. 18 and 19 are enlarged sections of the tapes therefor;

Fig. 20 is an enlarged section on the line 20—20 of Fig. 16;

Figs. 21, 22 and 23 are respectively top, front and rear views of the novel slider therefor; and Fig. 24 is a section on the line 24—24 of Fig. 21.

It has been found desirable to provide a separable fastener, which has two tape sections, each woven to carry several sets of closure links, and a single slider which simultaneously couples or uncouples the cooperating closure link sets of the two tape sections. Further, it is preferred to provide the two tape sections with interlocking or overlapping edge portions, to thus obtain a fluid seal when the sets of closure links are in coupled relation, the slider being constructed to position the edge portions in the desired interlocking or overlapping relation when coupling the sets of closure links.

Referring to Figs. 1 to 10, which illustrate one embodiment of my invention, the separable fastener assembly includes two tape sections 10 and 11 and a slider 12. The tape section 10, see Fig. 3, is initially woven to provide a garment attaching portion 13, a closure link carrier 14 which is preferably in the form of an integrally woven warp thread of large diameter, a body section 15, which is shaped by the slider, a second closure link carrier 16 which is also preferably in the form of an integrally woven warp thread of large diameter, and a sealing portion 17, also shaped by the slider, and preferably provided with an end enlargement 18 in the form of an integrally woven large diameter warp thread or cord. Two sets of closure links 19, 20 are respectively secured to the carriers 14 and 16. The tape element 11, see Fig. 4, is made complementary to the tape element 10, and is provided with similar and corresponding parts, designated 13a to 20a, respectively.

When the parts are in coupled relation, as shown in Fig. 5, the closure link set 19 is coupled with the closure link set 20a, with the sealing portion 17a underlying these coupled link sets, and the closure link set 20 is coupled with the closure link set 19a, with the sealing portion 17 overlying these coupled link sets, whereby a double sealed coupling results, this double sealed coupling having substantially the same thickness as a single coupling, as the double sets are adjacent instead of overlying. Moreover, only two specially woven tapes are used, thus simplifying the manufacture and assembly of the parts.

The slider 12 has a base 21 to which the usual manual pull tab 22 is swivelled, and includes two coupler elements each provided with a sealing portion guide, see Figs. 6 to 10, these parts being preferably made in one piece. Referring to Fig. 6, the first coupler element 23 has a rear extension 24 which is part of the rear plate 25 of the guide 26, the upper plate 27 and the bend between the plates completing the guide, and the upper plate 27 then being bent downwardly to provide the lower plate 28 of the second sealing portion guide 29, which is bent to provide an upper plate 30 and a forward extension 31 from which the second coupler element 32 extends.

Referring now to Fig. 9, the sealing guides 26 and 29 are illustrated as having rounded bends 33 and 34; this construction is for the purpose of snugly receiving the large end cords or threads 18 and 18a, see Figs. 3, 4 and 5, to thus continually guide and properly align the sealing portions 17 and 17a during the coupling of the closure links.

The above described construction thus comprises two tape elements, integrally woven to each provide two laterally displaced closure link supports and end sealing portions or strips, and a single slider which simultaneously couples or uncouples four sets of cooperating closure links and smoothes out, guides, and aligns the sealing portions or strips during the coupling operation.

If desired, the large diameter warp threads at the edges of the sealing portions or strips may be omitted, thus simplifying the construction. Referring to Figs. 11 to 15, the assembly includes two tape elements 36, 37 and a slider 38, the tape element 36, see Fig. 13, having a garment securing portion 39, an enlarged warp thread 40 which is a carrier for a set of closure links 41, a central portion 42, which also has an enlarged warp thread 43 for carrying a set of closure links 44, and a sealing portion or strip 45. The tape element 37 has corresponding parts 39a to 45a, arranged in reverse order, and the assembly is shown in Fig. 15, the differences over the arrangement of the modification of Figs. 1 to 10 residing in the elimination of the sealing strip end cords and the removal of the arcuate recesses 33 and 34 which accommodated the end cords.

For constructions where a still simpler arrangement of parts, not requiring sealing portions or strips, is desirable, it is preferred to utilize a still further modified construction shown in Figs. 16 to 24 inclusive. In this arrangement, the tape elements 46, 47 and the slide 48 have no sealing devices other than the staggered double closure link lock. The tape element 46 has a garment attaching portion 49, an enlarged warp thread 50 for receiving one set of closure links 51, a body portion 52, and a terminal enlarged warp thread 53 for receiving a second set of closure links 54. The tape element 47 has a similar set of parts 49a to 54a, arranged in reverse order.

The slider 48 is generally similar to the slider 12, but with the sealing strip guide parts omitted. The slider comprises a face plate 55 to which the manual pull tab 55a is attached, a link coupler element 56 secured to the back of the face plate, and having an arm 57 extending upwardly to provide a reversely bent cross plate 58 which has a laterally displaced arm 59 to which a second link coupler element 60 is secured. This construction provides a double coupler arrangement in which the parts, when coupled, are in lateral displaced arrangement, see Fig. 20, and are of substantially the same thickness as a single separable slide fastener.

Although I have described specific constructional embodiments of my invention, it is obvious that changes in the size, shape, and arrangement of the parts may be made to suit different separable fastener requirements, without departing from the spirit or the scope of the invention as defined in the appended claims.

I claim:

1. In a separable fastener, two tape elements, each tape element comprising a garment attachable portion, a body portion, two closure link carrier members, one member positioned between the garment attachable portion and the body portion and the second member mounted on the free edge of the body portion, and two sets of closure links mounted on said carrier members in combination with slider means for simultaneously coupling and uncoupling the respective closure link sets mounted on the first members of each tape element with the closure link sets mounted on the second members of the other tape element.

2. In a separable fastener, two tape elements, each tape element comprising a garment attachable portion, a body portion and a sealing portion, two closure link carrier members, one member positioned between the garment attachable portion and the body portion and the second member positioned between the body portion and the sealing portion, and two sets of closure links mounted on said carrier members in combination with slider means for simultaneously coupling and uncoupling the respective closure link sets mounted on the first members of each tape element with the closure link sets mounted on the second members of the other tape element, said slider means guiding the sealing portions to extend between the coupled closure links and the tape element body portions.

3. In a separable fastener, two tape elements, each tape element comprising a garment attachable portion, a body portion and a sealing portion, two closure link carrier members, one member positioned between the garment attachable portion and the body portion and the second member positioned between the body portion and the sealing portion, said sealing portions having a terminal cord edge, and two sets of closure links mounted on said carrier members, in combination with slider means for simultaneously coupling and uncoupling the respective closure link sets mounted on the first members of each tape element with the closure link sets mounted on the second members of the other tape element, said slider means engaging the terminal cord edges for guiding the sealing portions to extend between the coupled closure links and the tape element body portions.

4. A tape element for a separable fastener having a garment attachable portion, a body portion, a closure link carrier member positioned between the body portion and the garment attachable portion, and a second closure link carrier member positioned at the free edge of the body portion.

5. A tape element for a separable fastener having a garment attachable portion, a body portion, and a sealing portion, a closure link carrier member positioned between the body portion and the garment attachable portion, and a second closure link carrier member positioned between the body portion and the sealing portion.

6. A tape element for a separable fastener having a garment attachable portion, a body portion, and a sealing portion, a closure link carrier member positioned between the body portion and the garment attachable portion, and a second closure link carrier member positioned between the body portion and the sealing portion, said sealing portion having a terminal cord edge.

7. A slider element for a separable fastener comprising a connector element, a coupler element secured to said connector element, and a second coupler element also secured to said connector element in adjacent relation to said first coupler element, the operative parts of one coupler element being reversely disposed with respect to the operative parts of the other coupler element.

8. A slider element for a separable fastener comprising a connector element having guide means for receiving and guiding tape sealing portions, a coupler element secured to said connector element, and a second coupler element also secured to said connector element in adjacent relation to said first coupler element, the operative parts of one coupler element being reversely disposed with respect to the operative parts of the other coupler element.

9. A slider element for a separable fastener comprising a connector element having guide means including arcuate guide recesses adapted to receive tape sealing portions provided with edge cords, a coupler element secured to said connector element, and a second coupler element also secured to said connector element in adjacent relation to said first coupler element, the operative parts of one coupler element being reversely disposed with respect to the operative parts of the other coupler element.

ISAAC MARINSKY.